April 8, 1930.　　　　J. T. WATTS　　　　1,754,072
EXTENSIBLE ELECTRIC CONDUCTOR

Filed Sept. 22, 1926

Inventor:-
John T. Watts
By Milo B. Stevens & Co.

Attorneys

Patented Apr. 8, 1930

1,754,072

UNITED STATES PATENT OFFICE

JOHN T. WATTS, OF CHICAGO, ILLINOIS

EXTENSIBLE ELECTRIC CONDUCTOR

Application filed September 22, 1926. Serial No. 137,026.

One of the principal objects of this invention is to eliminate the necessity for a special switch in apparatus of this kind and to construct the same with a peculiar expedient providing the desired switch as an integral part thereof.

Another object of my improvement is to simplify the structure, that it may be manufactured at a lower cost and handled with greater ease.

A final, but nevertheless important object of the invention is to render the control of the improved light automatic.

With the above objects in view and any others that may suggest themselves in the specification and claims to follow, a better understanding of the invention may be gained by reference to the accompanying drawing, in which—

Figure 2:
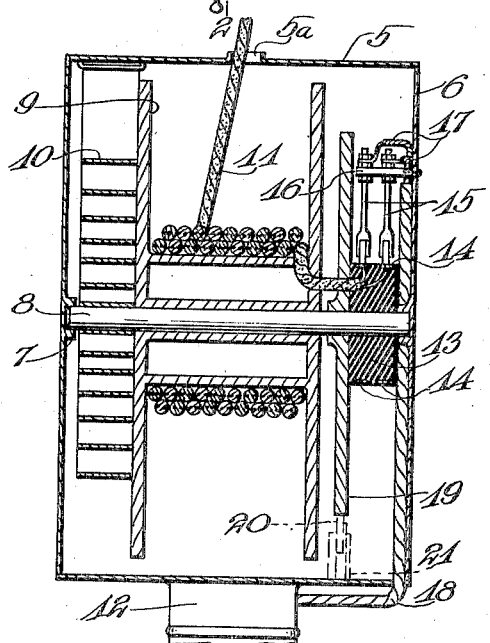
Fig. 2 is a cross section thereof, preferably taken on the line 2—2 of Figure 1.

As in the previous case, 5 denotes the housing for the novel apparatus, and 6 a suitable end closure therefor. The housing and the closure are made with bearings 7 to journal the spindle 8 on which the reel 9 is fixed to rotate and wind or unwind the coil type spring 10. The lamp cord 11 depends from a suitable service outlet in the ceiling (not shown), entering the housing through a top opening 5ª, and being wound upon the reel as clearly shown in Figure 2.

As in the previous case, I employ a ratchet disk 19 on the reel spindle 8, and a pawl 20 to control such disk. The pawl 20 is urged toward the periphery of the disk by an expanding spring 21, although any other suitable device may be used for this purpose; and the pawl is provided with an attaching lug 22 from which depends a pull cord or chain 23, having the primary function of the chain 15 in the patent referred to.

As before, the pull of the cord or chain 23 draws on the housing 5 to unwind the reel 9 against the tension of the spring 10, and when the cord is released the pawl acts to stop the further unwinding and the light remains in the position to which it has been lowered. Conversely, when the cord is given a tug to again withdraw the pawl, the spring 10 will take up the cord 11 as long as the cord is held.

Figure 1:
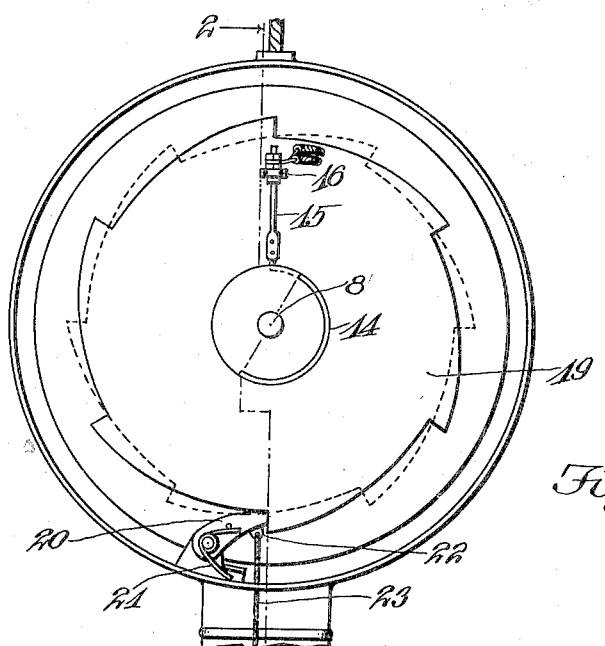
Figure 1 is an elevation of the interior of the improved apparatus.

My improvement deals with the novel expedient of having the commutator 13 serve not only as a current transfer, but also as a circuit breaker or switch. Thus, I construct the peripheral segments 14 of semi-circular or 180° length, and position them at an angle to the radial lines representing the falls of the ratchet disk 19. In this connection, I choose to use a disk with six teeth, as clearly shown in Figure 1; and it will be seen that a diametrical line coincident with the ends of the peripheral commutator segments 14 is midway between two disk falls. This arrangement first secures an intermittent transfer of the current, the light flashing on and off as the reel turns; and second, the brushes always find a broad surface of insulation or segment whatever the stopping point of the commutator may be. Thus, I eliminate the possibility of arcing, which would be the case if I positioned the segments so that either end thereof might stop opposite or in close proximity to the brushes 15 at such time as the pawl 20 engages a given fall of the ratchet disk 19. To secure the desirable position for the commutator relative to the disk 19, I first position the commutator to render the ends of its segments in a vertical plane, as indicated by dotted lines in Figure 1, and then turn the ratchet disk 19 to a position where such plane will be midway between two falls, as also indicated by dotted lines in the same figure. The commutator and the ratchet disk are then either tied together or suitably fixed on the spindle against relative motion, so that the desired relation between the two parts may remain constant.

It will be seen that I have provided a simple means for switching on the current for the light as well as for the protection of the switch from corrosion or fire resulting from arcing. In operation, when the cord or chain 23 is drawn, the light comes on and off successively until lowered to the desired position, which will, of course, be one at which the light is on. Conversely, the final elevated position of the light will be designed to place the light in the off or inactive condition.

While I provide the segmental switches 14 to control both leads of the lamp cord, it may be desirable where a low and comparatively safe voltage is had to extend one of the segments to full-circular length, so as to cause but one of the leads to be interrupted. In cases of heavier voltage, however, the control of both current leads improves the safety factor of the device. The apparatus is exceedingly simple, and no delicate parts are involved, such as in the case of switches of a special nature. The structure is of few parts, light and compact, and should render service for long periods without any attention.

I claim:—

1. A cord take up and switch device comprising a frame, a current supply cord, a spring-drum journaled in the frame to take-up the current supply cord, and a switch incidental to the operation of the drum rotating at all times with the drum alternately turning on and off the current as the drum rotates.

2. A cord take up and switch device comprising a frame, a current supply cord, a spring-drum journaled in the frame to take-up the current supply cord, a commutator for the latter rotating at all times with the drum and having an interrupted peripheral conductor and a brush to collect the current from said conductor.

3. A cord take up and switch device comprising a frame, a current supply cord, a spring-drum journaled in the frame to take-up the current supply cord, a commutator for the latter rotating at all times with the drum and having an interrupted peripheral conductor, a brush to collect the current from said conductor, and a ratchet check for the rotation of said drum, the periods of such check being coincidental with the intermediate areas of the conducting and non-conducting portions of said commutator.

JOHN T. WATTS.